Figure 1:
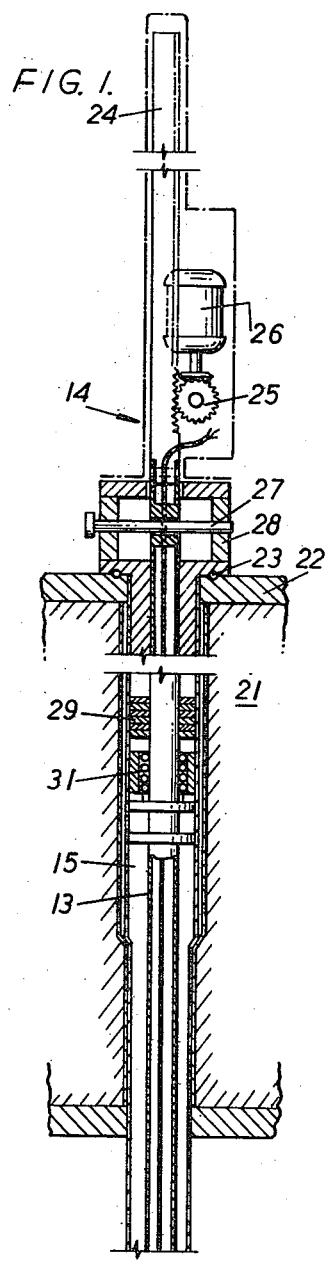

June 1, 1965    J. WEBB ET AL    3,186,914
ROD GRAB DEVICE

Filed Feb. 25, 1963    2 Sheets-Sheet 1

United States Patent Office 3,186,914
Patented June 1, 1965

3,186,914
CONTROL ROD GRAB DEVICE
John Webb, Bryn, near Wigan, and Owen Hayden, Bolton, England, assignors to United Kingdom Atomic Energy Authority, London, England
Filed Feb. 25, 1963, Ser. No. 260,614
Claims priority, application Great Britain, Mar. 2, 1962, 8,164/62
7 Claims. (Cl. 176—33)

This invention relates to nuclear reactor control.

The reactivity of a nuclear reactor can be controlled by movement into or out of the reactor core of a control rod of material which has the power to alter the neutron multiplication factor of the core. If the material is a neutron absorber then movement of the material into the core decreases reactivity and movement out of the core increases reactivity. If the material is fissile then reactivity of the core is increased by movement of the material into the core and decreased by movement of the material out of the core. Two forms of control are required. One form, referred to as operating control, must provide fine adjustment of a control rod in the reactor core. The second form, referred to as emergency control, must provide rapid movement of a control rod in such a direction as to decrease the reactivity of the core as rapidly as possible and with infallibility. There are control mechanisms in which control rods are held up against the force of gravity during normal operation of the reactor and allowed to fall under the action of gravity in an emergency to reduce core reactivity. Furthermore, it has been proposed that control rods should be held up by an electromagnetic device which is de-energised in an emergency; examples of such devices are shown in U.K. Patent No. 786,486 and in U.S. Patent No. 2,917,444.

The present invention provides control apparatus for a nuclear reactor comprising a control rod which has a ferromagnetic head and is movable between an upper inoperative position and a lower operative position and an electromagnetic grab capable when energised of holding the control rod by its head, the electromagnetic grab being movable for reaching the control rod in the aforesaid two positions and having a magnetising coil, a central polepiece of one polarity to contact an end face on the control rod head, and a plurality of fingers constituting polepieces of the other polarity which embrace the control rod head to complete a magnetic circuit through the head.

Preferably the central polepiece of the grab comprises one end of a core around which the magnetising coil is wound and a search coil is also wound round the core to enable detection of contact between the grab and the control rod head.

In one embodiment of the invention the electromagnetic grab has a spring-loaded pin slidable in a bore through the central polepiece, and a solenoid to withdraw the pin into the grab against its spring-loading when the grab is energised, the arrangement being such that on de-energisation of the grab the pin is sprung into a position in which its end protrudes through the central polepiece to assist disengagement of the control rod head from the grab.

Figure 2:
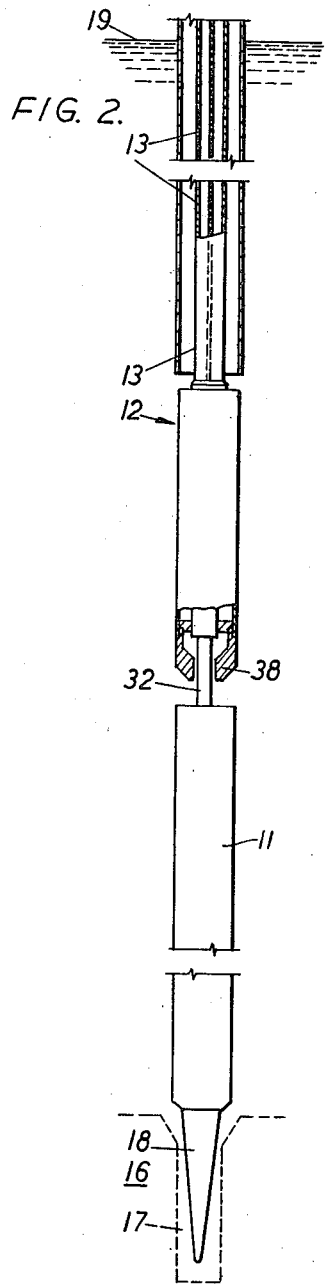
Figure 3:
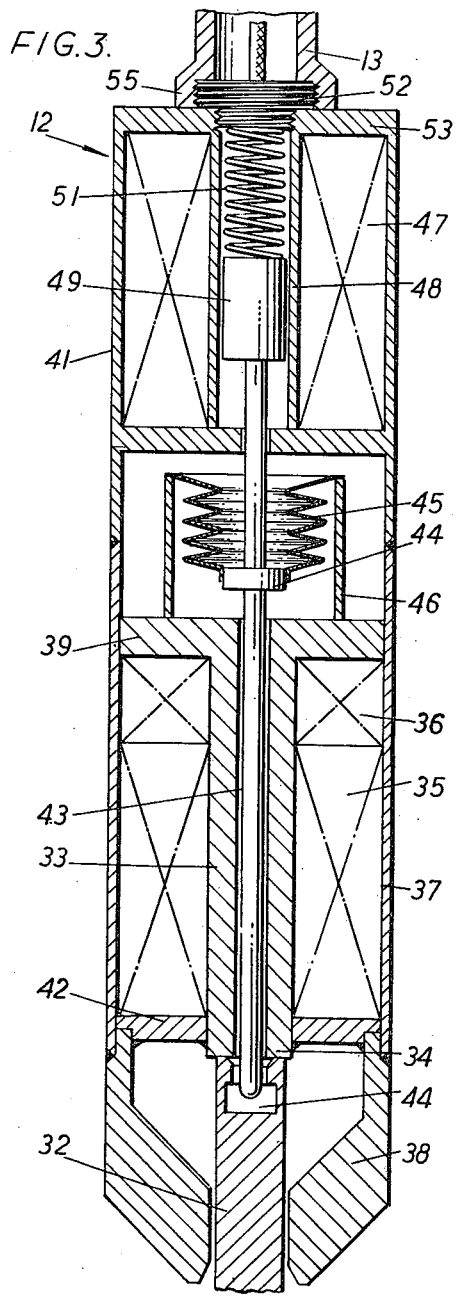

One embodiment of the invention will now be described by way of example with reference to the accompanying drawings in which:

FIGURES 1 and 2 show a diagrammatic sectional elevation of upper and lower parts of control apparatus embodying the invention, and FIGURE 3 shows a sectional view of a grab forming part of the apparatus of FIGURE 1.

Control apparatus which is particularly suited for emergency control of a nuclear reactor cooled by liquid metal comprises a control rod 11, a grab 12, an elongate plunger 13 and mechanism 14 by which the plunger is movable vertically in a sheath 15 (FIGURES 1 and 2). The control rod 11 is neutron absorbing being made of sintered nickel and boron encased in a steel can. This control rod is held out of the reactor core during normal operation of the reactor and is lowered into an operative position when the reactor is to be shut down. In its operative, shut down position the control rod is supported by a grid 16 (indicated in broken lines since the control apparatus is shown in its raised position); this grid is formed with a bore 17 to receive a tapered spike 18 at the lower end of the control rod. Since the control rod and the grid are immersed in liquid metal coolant, entry of the spike into the bore gives rise to a hydraulic dashpot action, liquid metal being forced out of the bore through decreasing annular clearance around the spike. This dashpot action brakes the fall of the control rod if it is dropped freely into the core during an emergency.

The grab 12 is electromagnetic and will be described in detail hereinafter. The grab is carried at the lower end of the plunger 13 which is hollow and is slidable in the sheath 15. The plunger and sheath extend upwardly above the liquid metal coolant free surface 19 and through a steel lined shield 21 by which a vessel enclosing the reactor core is closed. The upper end of the sheath is flanged and rests on a top plate 22 of the shield sealing with the top plate by means of an O ring 23. The sheath is enlarged at its upper end so that it plugs the bore in the shield 21 into which it is inserted. The tubular plunger extends above the sheath and is threaded at its upper end for attachment to a rack 24. A pinion 25 meshing with the rack is driven by a motor 26 for moving the plunger vertically in the sheath. A locking pin 27 is insertable through bores in a collar 28 and a bore through a solid portion of the plunger when it is in its raised position. An alarm switch responsive to a change of pressure in the plunger may be located at the upper end of the plunger to actuate an alarm if the plunger develops a leak.

Since the interior of the vessel enclosing the reactor core is pressurised, it is necessary to provide a fluid-tight seal between the plunger and the sheath. The seal is constituted by a stuffing box seal 29. Although not shown it is envisaged that this stuffing box may have a chamber bounded on either side by nylon seals and pressurised with a continuous fluid feed so that any leakage through the seals would be from the pressurised chamber into the reactor vessel or to atmosphere. Leakage from the reactor vessel is therefore prevented positively. A linear ball bush 31 is provided to ease movement of the plunger in the sheath. A top hat enclosure (indicated in broken lines) may be provided as an additional safety precaution.

With the control rod in its lower operative position supported by the grid, the reactor is normally shut down. To raise the control rod, the plunger is lowered until the grab contacts a ferromagnetic head 32 on the control rod, the grab is electrically energised and the plunger raised to lift the control rod to its inoperative position. At any moment the control rod can be dropped back into its operative position, to reduce the reactivity of the core, by de-energisation of the grab whereupon the control rod is disengaged from the grab and falls freely. The grab may be automatically de-energised whenever emergency conditions arise in the reactor in any one of many well known ways; for instance energisation of the grab may be electrically dependent on the supply to electrically driven coolant pumps so that failure of the electrical supply to these pumps causes an automatic reduction of the core reactivity.

The electromagnetic grab (FIGURE 3) has a mild steel core 33 one end of which provides a central polepiece 34. Wound around this core is a magnetising coil 35 and a search coil 36, the electrical leads from which are taken out of the reactor through the hollow plunger. The coils are wound with wire having insulation which can withstand temperatures up to 850° C. Examples of such wire are anodised aluminium wire sold under the trade name Anadol, and copper wire coated with nickel and sprayed with a ceramic which is sold under the trade name Ceramatemp. A mild steel cylindrical casing 37 enclosing the coils has welded at its lower end (to the right in FIGURE 3) four symmetrically arranged mild steel fingers 38 of which only two appear in FIGURE 3. A mild steel web 39 integral with the upper end of the core is a push fit in the casing 37. The fingers are spaced at their base from the central polepiece 34 by a non-magnetic stainless steel web 42 welded to the central polepiece. When the grab engages a control rod, the head 32 of the control rod is embraced by the fingers with the upper face of head 32 in contact with the central polepiece. In this position the head completes a mild steel circuit for the magnetic flux caused by energisation of the magnetising coil 35; this circuit includes the core 33, the web 39, the casing 37 and the fingers 38 and is not short-circuited by the stainless steel web 42 which offers greater reluctance to the magnetic flux than the mild steel components of the circuit. The flux through this circuit is considerably greater when the head 32 completes it than when the head 32 is absent. The size of the magnetic flux through the circuit is detected by the search coil 36 which thus provides an indication of whether a control rod is engaged by the grab or not.

Disengagement of a control rod from the grab is assisted by a pin 43 slidable in a bore extending axially of the core 33. The lower end of the pin protrudes through the central polepiece into a cavity 44 formed in the head 32 of the control rod. Above the web 39, the pin carries a collar 44 to limit movement of the pin through the bore and to provide a seat for one end of a bellows seal 45 the other end of which is secured to a cylindrical bellows casing 46 within a stainless steel extension 41 of the grab casing 37. The bellows prevents entry of liquid metal coolant into the grab through the bore for pin 43. Above the bellows the extension 41 houses a solenoid 47 wound around a tubular former 48 in which slides a piston 49 carried at the upper end of the pin. The piston is loaded by a spring 51 bearing against a plug 52 screwed into the end cap 53 of the extension but is retracted into the solenoid against the action of the spring when the solenoid is energised. A web 54 supports the lower end of the former 48 and guides the pin in its movement. The plug 52 is externally threaded for screwing into an adaptor 55 at the lower end of the plunger by which the grab is supported.

The solenoid 47 and the magnetising coil 35 are electrically connected in series so that the pin is retracted by the solenoid when a control rod is carried by the grab. When the solenoid is de-energised the pin is sprung through the core so that its lower end strikes the head of the control rod and assists disengagement of the control rod from the grab.

It is to be understood that this invention is not limited by the details of the foregoing example. For instance, although the example relates to an emergency control rod, the rod could function simultaneously as an operating control rod. Furthermore, detection of the presence or absence of a control rod at the grab may be by means other than the search coil 36; for example, by a pin which is moved into the grab when the control rod head contacts the grab, and limit switches operated by the pin.

What we claim is:

1. A grab device for a nuclear reactor control rod, having a ferromagnetic head and movable between an upper inoperative position and a lower operative position, comprising an electromagnetic grab capable when energised of holding the control rod by its head, the electromagnetic grab being movable for reaching the control rod in the aforesaid two positions and having a magnetising coil, a central polepiece of one polarity to contact an end face on the control rod head and a plurality of fingers constituting polepieces of the other polarity which embrace the control rod head to complete a magnetic circuit through the head.

2. A grab device as claimed in claim 1 wherein the central polepiece of the grab comprises one end of a core around which the magnetising coil is wound and wherein a search coil also wound around the core enables detection of contact between the grab and the control rod head.

3. A grab device as claimed in claim 2 wherein the coils are enclosed by a cylindrical casing and are positioned between two webs mounted at the ends of the core, one first web being of material to complete a magnetic circuit between the core and the casing and the second web beyond which the central polepiece and fingers project being of material of greater magnetic reluctance than the first web so that the magnetic circuit between the central polepiece and the fingers is not bridged by the second web.

4. A grab device as claimed in claim 3 wherein the core, casing and first web are of mild steel and the second web is of stainless steel.

5. A grab device as claimed in claim 1 wherein a spring-loaded pin is slidable in a bore through the central pole piece and a solenoid is provided in the grab to withdraw the pin into the grab against its spring loading when the solenoid is energised, the arrangement being such that on de-energisation of the solenoid the pin is sprung into a position in which its end protrudes through the central polepiece to assist disengagement of the control rod head from the grab.

6. A grab device as claimed in claim 5 wherein the solenoid is connected in series with the magnetising coil.

7. A grab device for a nuclear reactor control rod, having a ferromagnetic head and movable between an upper inoperative position and a lower operative position, comprising an electromagnetic grab, a plunger at the lower end of which the grab is mounted, means to move the plunger to enable the grab to reach the control rod head in the aforesaid two positions, the electromagnetic grab having a mild steel core, a magnetising coil wound around the core, a search coil also wound around the core to enable detection of contact between the grab and the control rod head, a cylindrical mild steel casing enclosing the magnetising and search coils, a first mild steel web interconnecting one end of the core and the casing, a second stainless steel web interconnecting the core and the casing near its other end, a central polepiece constituted by the end of the core projecting through the stainless steel web, and a plurality of mild steel fingers projecting from the casing beyond the stainless steel web to embrace the control rod head whereby a magnetic circuit incorporating the control rod head, the fingers, the casing, the mild steel web, the core and the central polepiece is completed when the control rod head is in contact with the central polepiece.

References Cited by the Examiner

UNITED STATES PATENTS 2,825,599   3/58   Dent.

FOREIGN PATENTS 834,365   5/60   Great Britain.

OTHER REFERENCES

Schurtz: "Control of Nuclear Reactors and Power Plants," 1955 edit., pp. 114, 119.

CARL D. QUARFORTH, *Primary Examiner.*

REUBEN EPSTEIN, *Examiner.*